US012579269B2

(12) United States Patent
Sundar et al.

(10) Patent No.: US 12,579,269 B2
(45) Date of Patent: Mar. 17, 2026

(54) ARTIFICIAL INTELLIGENCE (AI)-BASED SYSTEM FOR DETECTING MALWARE IN ENDPOINT DEVICES USING A MULTI-SOURCE DATA FUSION AND METHOD THEREOF

(71) Applicant: Privafy Inc, Burlington, MA (US)

(72) Inventors: Rangamani Sundar, Burlington, MA (US); Xuepeng Sun, Burlington, MA (US); Gurudutt Pai, Burlington, MA (US); Kumar Vishwanathan, Burlington, MA (US); Vijay Sankar Veeriah, Bangalore (IN); Srinivasan Krishnamoorthy, Bangalore (IN)

(73) Assignee: Privafy Inc

( * ) Notice: Subject to any disclaimer, the term of this patent is extended or adjusted under 35 U.S.C. 154(b) by 77 days.

(21) Appl. No.: 18/820,323

(22) Filed: Aug. 30, 2024

(65) Prior Publication Data

US 2025/0117485 A1      Apr. 10, 2025

Related U.S. Application Data

(60) Provisional application No. 63/589,037, filed on Oct. 10, 2023.

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC .......................... G06F 21/56; G06F 2221/034
See application file for complete search history.

(56) References Cited

U.S. PATENT DOCUMENTS

| | | | |
|---|---|---|---|
| 10,057,279 B1* | 8/2018 | Balduzzi | H04L 63/145 |
| 2020/0076835 A1* | 3/2020 | Ladnai | G06N 20/20 |
| 2020/0145441 A1 | 5/2020 | Patterson et al. | |
| 2021/0176257 A1* | 6/2021 | Yavo | H04L 63/02 |
| 2021/0243212 A1 | 8/2021 | Bowman et al. | |
| 2021/0392147 A1* | 12/2021 | Ma | G06N 3/0455 |
| 2023/0222208 A1* | 7/2023 | Razi | G06N 3/088 |
| | | | 726/23 |

FOREIGN PATENT DOCUMENTS

WO        2020046575 A1      3/2020

* cited by examiner

*Primary Examiner* — Shanto Abedin
(74) *Attorney, Agent, or Firm* — Jason C. Cameron

(57)        ABSTRACT

An artificial intelligence (AI)-based system for detecting malware in endpoint devices using a multi-source data fusion and method thereof are disclosed. The AI-based system collects at least one of: endpoint visibility data, publicly available information, and sandbox analysis data using the multi-source data fusion. By using the collected data, the AI-based system generates one or more numerical embeddings for at least one of: one or more files and one or more applications of each endpoint device using one or more AI models. The AI-based system is configured with the one or more AI models to generate one or more dynamic directed graphs based on the generated one or more numerical embeddings to compute a maliciousness risk score. The maliciousness risk score of at least one of the: one or more files and one or more applications is used for detecting the malware in the one or more endpoint devices.

20 Claims, 7 Drawing Sheets

100

200

Publishers of apps as graph nodes

Known malware and unlabeled apps as graph nodes with embeddings

Software libraries used by the apps as graph nodes

400

500

Collect, by a monitoring engine associated with each endpoint device of the one or more endpoint devices, endpoint visibility data associated with at least one of: one or more files and one or more applications of each endpoint device 502

Collect, by a resource data collecting module, at least one of: publicly available information and sandbox analysis data 504

Obtain, by one or more servers, at least one of the: endpoint visibility data, publicly available information and sandbox analysis data using the multi-source data fusion 506

Generate, by the one or more servers, one or more numerical embeddings for at least one of: each file of the one or more files and each application of the one or more applications of each endpoint device using one or more artificial intelligence (AI) models based on at least one of the: endpoint visibility data, publicly available information and sandbox analysis data 508

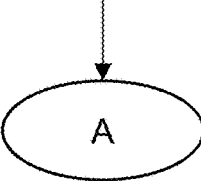

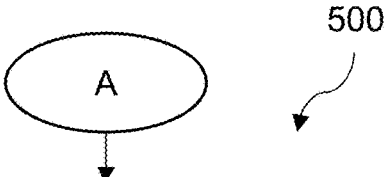

500

Generate, by the one or more servers configured with the one or more artificial intelligence (AI) models, one or more dynamic directed graphs comprises at least one of: one or more nodes and one or more edges of each endpoint device of the one or more endpoint devices based on the generated one or more numerical embeddings for analyzing the endpoint visibility data 510

Assign, by the one or more servers, a label to each node of the one or more nodes across the one or more dynamic directed graphs using one or more machine learning models based on a pre-defined labeled dataset to classify the one or more nodes as one of a: benign node and malicious node 512

Compute, by the one or more servers, a maliciousness risk score for each node of the one or more nodes using the one or more artificial intelligence (AI) models based on at least one of the: assigned labels, one or more numerical embeddings, and one or more dynamic directed graphs for detecting the malware in the one or more endpoint devices 514

ARTIFICIAL INTELLIGENCE (AI)-BASED SYSTEM FOR DETECTING MALWARE IN ENDPOINT DEVICES USING A MULTI-SOURCE DATA FUSION AND METHOD THEREOF

EARLIEST PRIORITY DATE

This Application claims priority from a Provisional patent application filed in the United States of America having Patent Application No. 63/589,037, filed on Oct. 10, 2023, and titled "SYSTEM AND METHOD FOR DETECTING MALWARE USING MULTI-SOURCE DATA FUSION AND GRAPH-BASED ANALYSIS".

TECHNICAL FIELD

Embodiments of the present disclosure relate to a field of cybersecurity, and more particularly to an artificial intelligence (AI)-based system and an artificial intelligence (AI)-based method for detecting malware in one or more endpoint devices using a multi-source data fusion, graph neural networks (GNNs), deep learning models, and other one or more AI-based models.

BACKGROUND

Malware, short for malicious software, encompasses a broad range of harmful programs designed to disrupt, damage, and gain an unauthorized access to one or more endpoint devices. The malware is introduced via various vectors, including, but not limited to, at least one of: infected email attachments, compromised websites, malicious downloads, unauthorized software installations, and the like. Viruses, worms, and a ransomware are particularly concerning types of the malware. The ransomware, for instance, has become increasingly prevalent and poses severe malware to individuals, businesses, and critical infrastructure.

Traditional antivirus and anti-malware solutions primarily rely on signature-based detection. The traditional antivirus and anti-malware solutions maintain databases of known malware signatures and compare them against files and programs associated with the one or more endpoint devices to identify matches. However, the signature-based detection is limited to detecting known malware variants and struggles with new and unknown malware. This limitation is particularly problematic given a rapid evolution of malware techniques.

To address the limitations of the signature-based detection, a malware management platform is disclosed. The malware management platform employ heuristics and behavior-based techniques. The heuristics and behavior-based techniques analyze a behavior of files and programs to identify malicious activities that indicate the malware in the one or more endpoint devices. This includes monitoring for unauthorized access, file modifications, system changes, network communications, and other potentially malicious behaviors. However, the heuristics and behavior-based techniques generate high false positives, flagging legitimate files and applications as malicious, and also result in false negatives where the malware goes undetected.

Current malware detection systems face several technical challenges. Existing technologies rely on isolated security functions and sources of information, leading to fragmented and incomplete insights into the potential malware. Without a proper correlation between security events and the specific applications and files causing them, it becomes challenging to accurately identify and attribute the malicious activities.

Furthermore, many existing technologies lack a capability for iterative refinement and interaction with human experts. This limitation hinders the system's ability to learn from new malware and adapt to evolving attack techniques. Additionally, the process of extracting Indicators of Compromise (IOCs) manually and through traditional methods is time-consuming and inefficient.

Recent advancements in artificial intelligence (AI) and machine learning have shown promise in addressing some of these challenges. For instance, graph-based approaches have demonstrated effectiveness in modeling complex relationships between the files and hosts. However, these solutions struggle with the dynamic nature of endpoint environments and the need for real-time analysis of multi-source data.

There are various technical problems with the malware detections in the prior art. In the existing technology, the signature-based detection struggles to identify new and modified malware variants, as they rely on the known malware signatures. This leaves the existing systems vulnerable to zero-day attacks and rapidly evolving malware. The heuristics and behavior-based techniques generate the high rates of the false positives, incorrectly flagging legitimate software as malicious. This leads to unnecessary alerts and potential disruption of legitimate business operations. Many detection systems operate in a isolation, lacking ability to correlate data from multiple security functions and information sources. This fragmented approach results in incomplete malware intelligence and misses detection opportunities. The existing technologies fail to adequately capture and analyze the diverse attributes and behaviors of the applications and the files, limiting their ability to accurately classify them as malicious and benign. The current systems lack mechanisms for continuous learning and adaptation. They struggle to keep pace with the rapidly evolving nature of the malware and the new attack techniques. The process of extracting the IOCs is manual and relies on outdated methods, making it time-consuming and inefficient. This delays response times to emerging malware. Many existing solutions do not provide effective means for the human experts to interact with and refine the detection system, limiting the incorporation of expert knowledge and contextual understanding. Real-time analysis of large volumes of data from multiple sources remains the challenge for many current systems, impacting their ability to detect malware quickly in dynamic endpoint environments. The existing graph-based approaches, while promising, struggle to handle the scale and complexity of relationships in large enterprise networks.

Therefore, there is a significant need for a system that can address these limitations and provide a more robust, adaptive, and efficient solution for detecting and tackling the malware in an ever-evolving cybersecurity landscape.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, an artificial intelligence (AI)-based system for detecting malware in one or more endpoint devices using a multi-source data fusion is disclosed. The AI-based system comprises a monitoring engine, a resource data collecting module, and one or more servers. The one or more servers is configured with one or more hardware processors and a memory unit. The memory unit is operatively connected to the one or more hardware processors, wherein the memory unit comprises a set of computer-readable instructions in form of a plurality of subsystems. The plurality of subsystems is configured to be executed by the one or more servers. The plurality of subsystems comprises a data-obtaining subsystem, a graph generation subsystem, an embeddings generation subsystem, a label propagation subsystem, a maliciousness scoring subsystem, and an attribute synthesis subsystem.

In an embodiment, the monitoring engine is associated with each endpoint device of the one or more endpoint devices. The monitoring engine is configured to collect endpoint visibility data associated with at least one of: one or more files and one or more applications of each endpoint device. The monitoring engine comprises at least one of: a Secure Service Edge (SSE), an Extended Detection and Response (XDR), an Endpoint Detection and Response (EDR), a Sandbox, Vulnerability Management (VM) tools, a sysmon engine, an OSQuery engine, an AuditD engine, a Windows Management Instrumentation (WMI) engine, a Prometheus Node Exporter, an Elastic Agent, a Splunk Universal Forwarder, Apple Device Management (MDM). The one or more endpoint devices comprises at least one of: computers, mobile devices, and networking equipment. The endpoint visibility data comprises at least one of: process activities, file accesses, network connections, system libraries, application metadata, application behavior, event logs, user activity, endpoint configuration, existing security alerts, Secure Service Edge (SSE) events, Secure Service Edge (SSE) logs, Extended Detection and Response (XDR) events, Extended Detection and Response (XDR) logs, vulnerability management events, and vulnerability management logs.

In an embodiment, the resource data collecting module configured to collect at least one of: publicly available information and sandbox analysis data. The publicly available information comprises at least one of: publisher details, publish dates, region of the publisher, country of the publisher, and user ratings and user reviews about at least one of the: one or more files and one or more applications of each endpoint device of the one or more endpoint devices. The sandbox analysis data comprises at least one of: libraries used during execution, central processing unit (CPU) utilization, endpoint device memory usage patterns, file events, Registry events, startup events, autostart events, Domain Name System (DNS) queries, Internet Protocol (IP) addresses accessed, network ports opened, network ports for listening, port type, traffic type, encrypted traffic, unencrypted traffic, cipher used for encrypted traffic, cipher strength, and connection duration.

In an embodiment, the data-obtaining subsystem is configured to obtain at least one of the: endpoint visibility data, publicly available information and sandbox analysis data using the multi-source data fusion. The data-obtaining subsystem is operatively connected to a data correlation subsystem. The data correlation subsystem is configured to perform the multi-source data fusion for correlating at least one of the: endpoint visibility data, publicly available information, and the sandbox analysis data based on at least one of: user identifications (IDs) and timestamps to create at least one of: time-ordered sequence of events, and pre-defined time intervals for processing the endpoint visibility data for detecting the malware. The pre-defined time intervals range between 1 minute and 15 minutes.

In yet another embodiment, the embeddings generation subsystem is configured to generate one or more numerical embeddings for at least one of: each file of the one or more files and each application of the one or more applications of each endpoint device using one or more artificial intelligence (AI) models based on at least one of the: endpoint visibility data, publicly available information and sandbox analysis data. The embeddings generation subsystem is operatively connected with an unsupervised training subsystem. The unsupervised training subsystem is configured with an autoencoder to pre-train the embeddings generation subsystem using at least one of: unlabeled endpoint visibility data, the publicly available information, and the sandbox analysis data to learn at least one of: general patterns and feature values of one or more nodes associated with one or more dynamic directed graphs for generating the one or more numerical embeddings. The embeddings generation subsystem is configured to use a Graph Convolutional Network (GCN) as the one or more artificial intelligence (AI) models to generate the one or more numerical embeddings.

In yet another embodiment, the graph generation subsystem is configured with one or more artificial intelligence (AI) models to generate the one or more dynamic directed graphs comprises at least one of: one or more nodes and one or more edges of each endpoint device of the one or more endpoint devices based on the generated one or more numerical embeddings for analyzing the endpoint visibility data. The graph generation subsystem is configured with Graph Neural Networks (GNNs) as the one or more AI models to generate the one or more dynamic directed graphs in real-time as up-to-date endpoint visibility data is obtained in the data-obtaining subsystem. The graph generation subsystem is configured to update the one or more dynamic directed graphs by terminating at least one of the: one or more nodes and one or more edges within a pre-defined time period to control a size of the one or more dynamic directed graphs to infinity. The pre-defined time period ranges between 24 hours and 120 hours.

In yet another embodiment, each node of the one or more nodes in the one or more dynamic directed graphs represent one or more endpoint activities. The one or more endpoint activities comprises at least one of: process behaviors, file access patterns, and network communication flows on each endpoint device. Each edge of the one or more edges in the one or more dynamic directed graphs represent at least one of: interactions and relationships between the one or more nodes. At least one of the: interactions and relationships comprises at least one of: process-to-process communications, process-to-library communications, and process-to-file communications.

In yet another embodiment, the label propagation subsystem is configured to assign a label to each node across the one or more dynamic directed graphs using one or more machine learning models based on a pre-defined labeled dataset for optimizing the generation of the one or more numerical embeddings to classify the one or more nodes as one of a: benign node and malicious node. The label propagation subsystem is configured to use a label propagation model as the one or more machine learning models and the GNNs as the one or more AI models to iteratively update and optimize the label of each node based on one or more neighboring nodes using a weighted majority rule.

In yet another embodiment, the label propagation subsystem is operatively connected with a supervised learning subsystem. The supervised learning subsystem is configured to optimize the label propagation subsystem using one or more objective functions for optimizing the generation of the one or more numerical embeddings.

In yet another embodiment, the maliciousness scoring subsystem is configured to compute a maliciousness risk score for each node using the one or more AI models based on at least one of the: assigned labels, one or more numerical embeddings, and one or more dynamic directed graphs for detecting the malware in the one or more endpoint devices.

In yet another embodiment, the maliciousness scoring subsystem is configured to use the GNNs as the one or more AI models to compute the maliciousness risk score. The maliciousness risk score comprises a defined range. Wherein if the maliciousness risk score is one of: within a threshold score of the defined range and equal to the threshold score of the defined range, the AI-based system determines that at least one of the: one or more files and one or more applications associated with the one or more nodes is benign. Wherein if the maliciousness risk score exceeds the threshold score of the defined range, the AI-based system determines that at least one of the: one or more files and one or more applications associated with the one or more nodes is malicious.

In yet another embodiment, the maliciousness scoring subsystem is operatively connected to an alert generation subsystem. The alert generation subsystem is configured to generate one or more alerts if the generated maliciousness risk score exceeds the threshold score of the defined range.

In yet another embodiment, the attribute synthesis subsystem is configured to generate one or more synthetic attributes using the endpoint visibility data during the pretrain of the embeddings generation subsystem for optimizing at least one of the: detection of the malware and one or more AI models. The one or more synthetic attributes is numerical vectors of a fixed dimensions of 128.

In accordance with an embodiment of the present disclosure, an artificial intelligence (AI)-based method for detecting the malware in the one or more endpoint devices using the multi-source data fusion is disclosed. In the first step, the AI-based method includes collecting, by the monitoring engine associated with each endpoint device of the one or more endpoint devices, the endpoint visibility data associated with at least one of the: one or more files and one or more applications of each endpoint device. In the next step, the AI-based method includes collecting, by the resource data collecting module, at least one of the: publicly available information and sandbox analysis data.

In the next step, the AI-based method includes obtaining, by the one or more servers, at least one of the: endpoint visibility data, publicly available information and sandbox analysis data using the multi-source data fusion. In the next step, the AI-based method includes generating, by the one or more servers, the one or more numerical embeddings for at least one of: each file of the one or more files and each application of the one or more applications of each endpoint device using the one or more artificial intelligence (AI) models based on at least one of the: endpoint visibility data, publicly available information and sandbox analysis data.

In the next step, the AI-based method includes generating, by the one or more servers configured with the one or more artificial intelligence (AI) models, the one or more dynamic directed graphs comprises at least one of the: one or more nodes and one or more edges of each endpoint device of the one or more endpoint devices based on the generated one or more numerical embeddings for analyzing the endpoint visibility data. In the next step, the AI-based method includes assigning, by the one or more servers, the label to each node of the one or more nodes across the one or more dynamic directed graphs using the one or more machine learning models based on the pre-defined labeled dataset to classify the one or more nodes as one of the: benign node and malicious node.

In the next step, the AI-based method includes computing, by the one or more servers, the maliciousness risk score for each node of the one or more nodes using the one or more artificial intelligence (AI) models based on at least one of the: assigned labels, one or more numerical embeddings, and one or more dynamic directed graphs for detecting the malware in the one or more endpoint devices.

In accordance with an embodiment of the present disclosure, a non-transitory computer-readable storage medium storing computer-executable instructions that, when executed by the one or more servers, cause the one or more servers to perform operations for detecting the malware in the one or more endpoint devices using the multi-source data fusion.

The operations comprise: a) obtaining at least one of the: endpoint visibility data from each endpoint device of the one or more endpoint devices, publicly available information and sandbox analysis data using the multi-source data fusion, wherein at least one of the: endpoint visibility data, publicly available information and sandbox analysis data is associated with at least one of the: one or more files and one or more applications of each endpoint device, b) generating the one or more numerical embeddings for at least one of: each file of the one or more files and each application of the one or more applications of each endpoint device using the one or more AI models based on at least one of the: endpoint visibility data, publicly available information and sandbox analysis data, c) generating, using the one or more AI models, the one or more dynamic directed graphs comprises at least one of the: one or more nodes and one or more edges of each endpoint device of the one or more endpoint devices based on the generated the one or more numerical embeddings for analyzing the endpoint visibility data, d) assigning the label to each node of the one or more nodes across the one or more dynamic directed graphs using the one or more machine learning models based on the pre-defined labeled dataset for classifying the one or more nodes to classify the one or more nodes as one of the: benign node and malicious node, and e) computing the maliciousness risk score for each node of the one or more nodes using the one or more artificial intelligence (AI) models based on at least one of the: assigned labels, one or more numerical embeddings, and one or more dynamic directed graphs for detecting the malware in the one or more endpoint devices.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 5 illustrates an exemplary flow chart of an artificial intelligence (AI)-based method for detecting the malware in the one or more endpoint devices using the multi-source data fusion, in accordance with an embodiment of the present disclosure.

Figure 1:
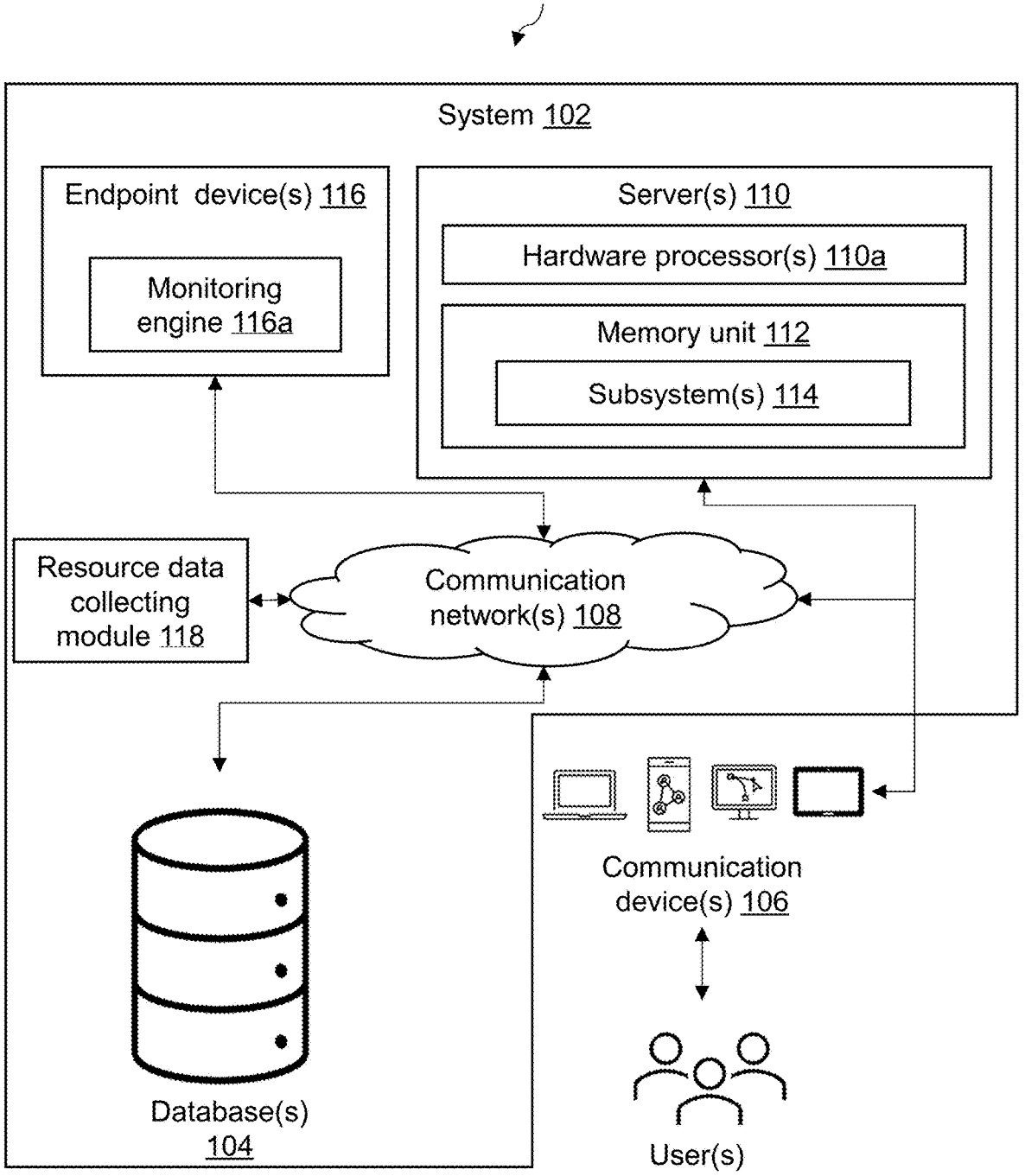
FIG. 1 illustrates an exemplary block diagram representation of a network architecture depicting an artificial intelligence (AI)-based system for detecting malware in one or more endpoint devices using a multi-source data fusion, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary block diagram representation of a network architecture 100 depicting an artificial intelligence (AI)-based system 102 for detecting malware in one or more endpoint devices 116 using a multi-source data fusion, in accordance with an embodiment of the present disclosure.

According to an exemplary embodiment of the present disclosure, the network architecture 100 may include the AI-based system 102, one or more databases 104, one or more communication devices 106, the one or more endpoint devices 116, and a resource data collecting module 118. The AI-based system 102 may be communicatively coupled to the one or more databases 104, the one or more communication devices 106, the one or more endpoint devices 116, and the resource data collecting module 118 via one or more communication networks 108. The one or more communication networks 108 may be, but not limited to, a wired communication network and/or a wireless communication network. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the one or more databases 104 may configured to store, and manage data related to various aspects of the AI-based system 102. The one or more databases 104 may store at least one of: endpoint visibility data, sandbox analysis data, publicly available information, and other relevant data for the malware detection. The one or more databases 104 may include different types of databases such as relational databases (e.g., Structured Query Language (SQL) databases), non-Structured Query Language (NoSQL) databases (e.g., MongoDB, Cassandra), graph databases (e.g., ArangoDB, Neo for Java (Neo4j)), time-series databases (e.g., InfluxDB), an OpenSearch database, and object storage systems (e.g., Amazon S3). The relational databases may be used to store structured data comprises, but not limited to, logs, event details, and metadata. The NoSQL databases may be employed to store unstructured and semi-structured data such as user activity data, network traffic details, and application behavior logs. The graph databases may be used to store and manage one or more dynamic directed graphs generated by the AI-based system 102, capturing relationships and interactions between various nodes. Time-series databases are ideal for storing time-stamped data, such as process activities, network connections, and other time-dependent events. The object storage systems may be utilized for storing large volumes of binary data, including files from sandbox analysis, machine learning models, and pre-trained embeddings. Additionally, the databases may implement advanced indexing, partitioning, and replication techniques to ensure high availability, scalability, and quick access to the data. The one or more databases 104 may also support various security features such as encryption, access control, and regular backups to protect sensitive information and ensure a data integrity within the AI-based system 102.

In an exemplary embodiment, the one or more communication devices 106 may represent various network endpoints, such as, but not limited to, user devices, mobile devices, smartphones, Personal Digital Assistants (PDAs), tablet computers, phablet computers, wearable computing devices, Virtual Reality/Augmented Reality (VR/AR) devices, laptops, desktops, and the like. The one or more communication devices 106 is configured to function as an intermediate unit between one or more users and the AI-based system 102. The one or more communication devices 106 are equipped with one or more user interfaces that allow the one or more users to interact with the AI-based system 102. The one or more user interfaces may include graphical displays, touchscreens, voice recognition, and other input/output mechanisms that facilitate easy access to the data and control functions. The one or more users may be, but not limited to, at least one of: cybersecurity analysts, network administrators, IT support personnel, security operations center (SOC) teams, incident response teams, forensic investigators, system administrators, software developers, compliance officers, and end-users. The one or more users is able to utilize the one or more communication devices 106 to monitor at least one of, but not limited to, endpoint activities, review security alerts, perform malware analysis, configure system settings, and initiate automated and manual remediation actions. The one or more communication devices 106 enable real-time interaction and decision-making, enhancing the overall efficiency and effectiveness of the AI-based system 102 in detecting and mitigating the malware.

In an exemplary embodiment, the one or more communication devices 106 may provide real-time updates and one or more alerts regarding status of the one or more endpoint devices 116 and the AI-based system 102. The real-time updates and the one or more alerts may include notifications about the detected malware, suspicious activities, system performance metrics, and security policy violations. The one or more alerts may be delivered through various channels, such as, but not limited to, push notifications, email alerts, short message service (SMS), in-app notifications, and dashboard alerts, ensuring timely awareness for the users. Additionally, the one or more communication devices 106 may support customizable alert thresholds and notification preferences to suit the specific needs and roles of the one or more users. This functionality allows the one or more users to promptly respond to potential malware and take appropriate actions to mitigate risks, thereby enhancing the overall security posture of the one or more endpoint devices 116.

In an exemplary embodiment, the AI-based system 102 may be implemented by way of a single device or a combination of multiple devices that may be operatively connected or networked together. The AI-based system 102 may be implemented in hardware or a suitable combination of hardware and software. The AI-based system 102 includes one or more servers 110 and is configured with one or more hardware processors 110*a* and a memory unit 112. The "one or more servers 110" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110*a* execute a set of computer-readable instructions for dynamically recommending the course of action sequences for detecting the malware in the one or more endpoint devices 116. The one or more hardware processors 110*a* is high-performance processors capable of handling large volumes of data and complex computations. The one or more hardware processors 110*a* may be, but not limited to, at least one of: multi-core central processing units (CPU), graphics processing units (GPUs), and specialized Artificial Intelligence (AI) accelerators that enhance an ability of the AI-based system 102 to process real-time data from one or more sources simultaneously.

The one or more hardware processors 110*a* is responsible for executing one or more artificial intelligence (AI) models that analyze at least one of the: endpoint visibility data, publicly available information and sandbox analysis data for detecting the malware in the one or more endpoint devices 116. The one or more hardware processors 110*a* may also include, for example, microprocessors, microcomputers, microcontrollers, digital signal processors, central processing units, state machines, logic circuits, and/or any devices that manipulate data or signals based on operational instructions. Among other capabilities, the one or more hardware processors 110*a* may fetch and execute the set of computer-readable instructions in the memory unit 112 operationally coupled with the AI-based system 102 for performing tasks such as data processing, input/output processing, and/or any other functions. Any reference to a task in the present disclosure may refer to an operation being or that may be performed on data.

The memory unit 112, which works in conjunction with the one or more hardware processors 110*a*, is configured to store and manage the vast amounts of the data collected from at least one of: a monitoring engine 116*a* and the resource data collecting module 118. The memory unit 112 is composed of at least one of: a non-transitory volatile memory and a non-volatile memory, ensuring that the data is readily accessible for processing while also being securely stored for long-term analysis and historical reference. The memory unit 112. The memory unit 112 may include a plurality of subsystems 114, configured to be executed by the one or more hardware processors 110*a*.

In an exemplary embodiment, the one or more endpoint devices 116 may comprises various types of computing and electronic devices that are potential targets for malware attacks. The one or more endpoint devices 116 may include, but not limited to, at least one of: computers, mobile devices, and networking equipment.

Each of the one or more endpoint devices 116 is equipped with the monitoring engine 116*a* that collects endpoint visibility data, which includes, but not limited to, at least one of: process activities, file accesses, network connections, system libraries, application metadata, application behavior, event logs, user activity, endpoint configuration, existing security alerts, Secure Service Edge (SSE) events, Secure Service Edge (SSE) logs, Extended Detection and Response (XDR) events, Extended Detection and Response (XDR) logs, vulnerability management events, vulnerability management logs, and the like. This comprehensive data collection enables the AI-based system 102 to analyze and detect the potential malware across a wide range of the one or more endpoint devices 116, providing robust protection for diverse network environments.

In an exemplary embodiment, the one or more endpoint devices 116 may be associated with, but not limited to, one or more service providers, one or more customers, an individual, an administrator, a vendor, a technician, a worker, a specialist, an instructor, a supervisor, a team, an entity, an organization, a company, a facility, a bot, any other user, and a combination thereof. The entities, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization, and the like.

In an exemplary embodiment, the monitoring engine 116*a* is associated with each endpoint device 116 of the one or more endpoint devices 116. The monitoring engine 116*a* is configured to collect the endpoint visibility data associated with at least one of: one or more files and one or more applications of each endpoint device 116. The monitoring engine 116*a* comprises at least one of, but not limited to, a Secure Service Edge (SSE), an Extended Detection and Response (XDR), an Endpoint Detection and Response (EDR), a Sandbox, Vulnerability Management (VM) tools, a sysmon engine, an OSQuery engine, an AuditD engine, a Windows Management Instrumentation (WMI) engine, a Prometheus Node Exporter, an Elastic Agent, a Splunk Universal Forwarder, Apple Device Management (MDM), and the like.

In an exemplary embodiment, the resource data collecting module 118 is configured to gather additional data from various sources that complement the endpoint visibility data collected from the one or more endpoint devices 116. The resource data collecting module 118 is configured to collect at least one of: publicly available information and sandbox analysis data. The publicly available information, including, but not limited to, publisher details, publish dates, region of the publisher, country of the publisher, and user ratings and user reviews about at least one of the: one or more files and one or more applications of each endpoint device 116 of the one or more endpoint devices 116. Additionally, the publicly available information, including, but not limited to, malware intelligence feeds, cybersecurity news, vulnerability databases, and the like. The resource data collecting module 118 may also gather sandbox analysis data, which includes, but not limited to, at least one of: libraries used during execution, central processing unit (CPU) utilization, endpoint device memory usage patterns, file events, Registry events, startup events, autostart events, Domain Name System (DNS) queries, Internet Protocol (IP) addresses accessed, network ports opened, network ports for listening, a port type, a traffic type, encrypted traffic, unencrypted traffic, a cipher used for the encrypted traffic, a cipher strength, a connection duration, and the like.

Additionally, the sandbox analysis data may comprise detailed behavioral analysis of suspicious files and applications executed in isolated environments. The resource data collecting module 118 integrates with external databases, web services, and application programming interfaces (APIs) to ensure comprehensive and up-to-date endpoint visibility data collection. The collected endpoint visibility data, the publicly available information, and the sandbox analysis data are then used to enhance the AI-based system's 102 ability to detect and analyze the malware by providing a broader context and deeper insights into the potential malware. By fusing the endpoint visibility data, the publicly available information, and the sandbox analysis data from multiple sources, the resource data collecting module 118 assists in creating a more accurate and holistic view of the security landscape, enabling the AI-based system 102 to improve its detection capabilities and reduce false positives.

Though few components and the plurality of subsystems 114 are disclosed in FIG. 1, there may be additional components and subsystems which is not shown, such as, but not limited to, ports, routers, repeaters, firewall devices, network devices, the one or more databases 104, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the AI-based system 102, and the one or more communication devices 106 connected to the one or more databases 104, one skilled in the art can envision that the AI-based system 102, and the one or more communication devices 106 may be connected to several user devices located at various locations and several databases via the one or more communication networks 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the AI-based system 102 as is unique to the present disclosure or necessary for an understanding of the present disclosure is depicted and described. The remainder of the construction and operation of the AI-based system 102 may conform to any of the various current implementations and practices that were known in the art.

Figure 2:
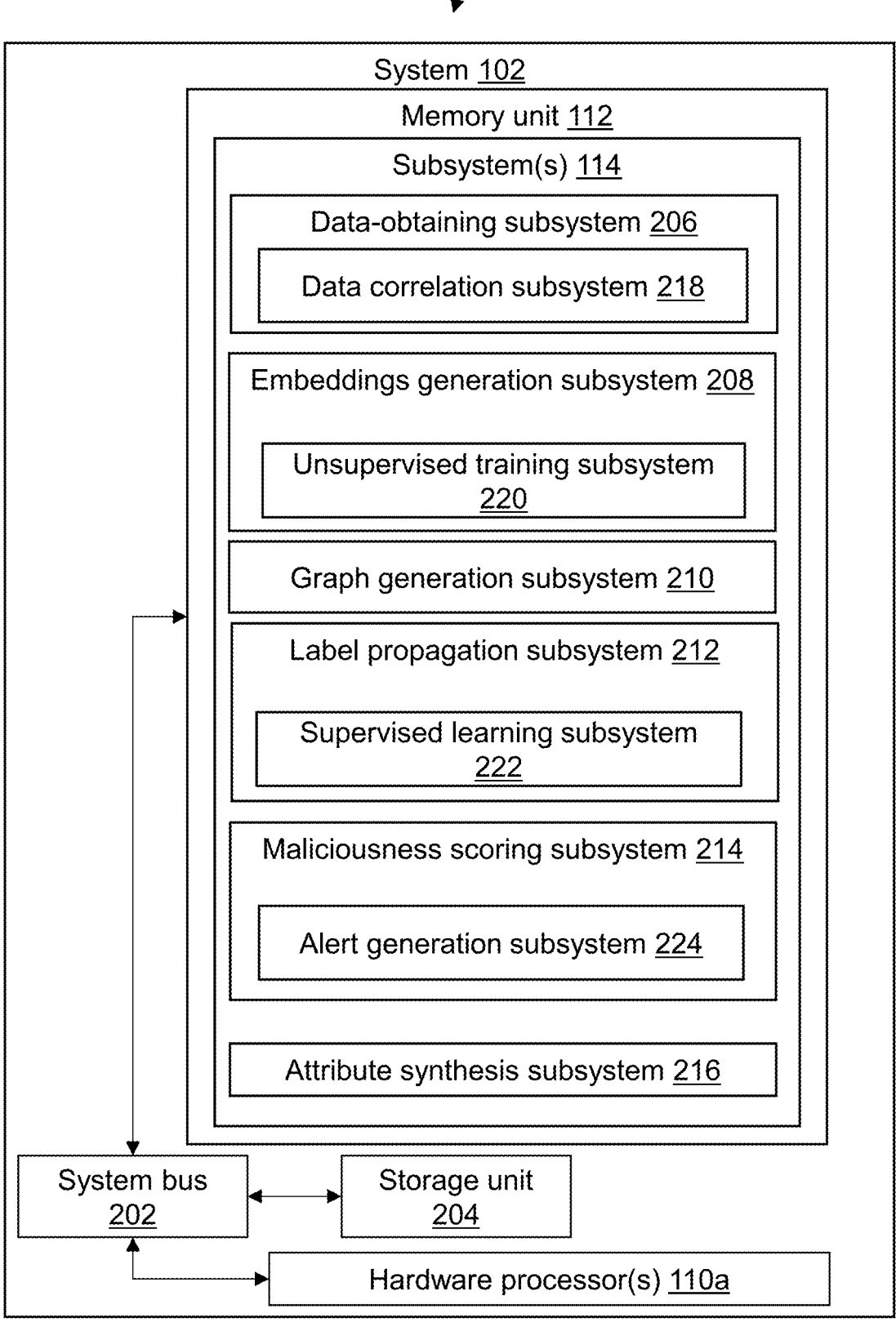
FIG. 2 illustrates an exemplary block diagram representation of the AI-based system as shown in FIG. 1 for detecting the malware in the one or more endpoint devices using the multi-source data fusion, in accordance with an embodiment of the present disclosure.

FIG. 2 illustrates an exemplary block diagram representation 200 of the AI-based system 102 as shown in FIG. 1 for detecting the malware in the one or more endpoint devices 116 using a multi-source data fusion, in accordance with an embodiment of the present disclosure.

In an exemplary embodiment, the AI-based system 102 (hereinafter referred to as the system 102). The system 102 comprises the one or more servers 110, the memory unit 112, and a storage unit 204. The one or more hardware processors 110*a*, the memory unit 112, and the storage unit 204 are communicatively coupled through a system bus 202 or any similar mechanism. The memory unit 112 is operatively connected to the one or more hardware processors 110*a*. The memory unit 112 comprises the plurality of subsystems 114 in the form of programmable instructions executable by the one or more hardware processors 110*a*.

The plurality of subsystems 114 comprises a data-obtaining subsystem 206, an embeddings generation subsystem 208, a graph generation subsystem 210, a label propagation subsystem 212, a maliciousness scoring subsystem 214, an attribute synthesis subsystem 216, a data correlation subsystem 218, an unsupervised training subsystem 220, a supervised learning subsystem 222, and an alert generation subsystem 224. The one or more hardware processors 110*a* associated within the one or more servers 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110*a* may also include embedded controllers, such as generic or programmable logic devices or arrays, application-specific integrated circuits, single-chip computers, and the like.

The memory unit 112 may be the non-transitory volatile memory and the non-volatile memory. The memory unit 112 may be coupled to communicate with the one or more hardware processors 110*a*, such as being a computer-readable storage medium. The one or more hardware processors 110*a* may execute machine-readable instructions and/or source code stored in the memory unit 112. A variety of machine-readable instructions may be stored in and accessed from the memory unit 112. The memory unit 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 112 includes the plurality of subsystems 114 stored in the form of machine-readable instructions on any of the above-mentioned storage media and may be in communication with and executed by the one or more hardware processors 110*a*.

The storage unit 204 may be a cloud storage or the one or more databases 104 such as those shown in FIGS. 1. The storage unit 204 may store, but not limited to, recommended course of action sequences dynamically generated by the system 102. These action sequences are based on at least one of the: endpoint visibility data, sandbox analysis data, publicly available information, historical malware detection data, real-time malware intelligence, user behavior patterns, system configurations, and current malware landscape. The storage unit 204 ensures that the action sequences are readily accessible for analysis and implementation. By storing this information, the system 102 provides contextually relevant and timely recommendations to the cybersecurity analysts and IT administrators for mitigating the detected malware. The storage unit 204 may also store logs of past incidents, system performance metrics, and configurations of the one or more endpoint devices 116 to aid in future malware detection and system optimization. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the data-obtaining subsystem 206 is configured to obtain at least one of the: endpoint visibility data, publicly available information, and sandbox analysis data using the multi-source data fusion. The data-obtaining subsystem 206 may interface with various sources and various security functions and modules deployed across the one or more communication networks 108 to gather comprehensive data required for malware detection and analysis. The endpoint visibility data includes detailed logs and real-time information from the one or more endpoint devices 116, such as, but not limited to, at least one of the: process activities, file accesses, network connections, system libraries, application metadata, application behavior, event logs, user activity, endpoint configuration, existing security alerts, Secure Service Edge (SSE) events, SSE logs, Extended Detection and Response (XDR) events, XDR logs, and the like. The publicly available information encompasses data from malware intelligence feeds, cybersecurity news, vulnerability databases, and other open sources that provide insights into emerging the malware and known vulnerabilities.

The sandbox analysis data comprises behavioral analysis results from executing suspicious files and applications in isolated environments, capturing details such as the libraries used during the execution, the CPU utilization, the memory usage patterns, the file events, the Registry events, the startup events, the autostart events, the DNS queries, the IP addresses accessed, the network ports opened, the network ports for listening, the port type, the traffic type, the encrypted traffic, the unencrypted traffic, the cipher used for the encrypted traffic, the cipher strength, and the connection duration.

The data-obtaining subsystem 206 is operatively connected to the data correlation subsystem 218. The data correlation subsystem 218 is responsible for performing the multi-source data fusion, which involves integrating and correlating data from different sources to provide a unified and comprehensive view of the security posture. The data correlation is based on at least one of the following criteria: user identifications (IDs) and timestamps. The user IDs are utilized in associating activities and events with specific one or more endpoint devices 116, while the timestamps enable a chronological ordering of events to understand the sequence and timing of the actions across the one or more endpoint devices 116. The data correlation subsystem 218 uses these criteria to create at least one of the following: time-ordered sequence of events and pre-defined time intervals for processing the endpoint visibility data. The time-ordered sequence of events allows for a detailed reconstruction of the actions leading up to and following a potential malware incident, providing valuable context for forensic analysis and incident response. The pre-defined time intervals, which range between 1 minute and 15 minutes, are used to batch and process data in manageable segments, ensuring that the system 102 may handle large volumes of data efficiently and detect the malware in near real-time. By segmenting the data into the pre-defined intervals, the system 102 may continuously monitor and analyze the one or more endpoint activities, quickly identifying any anomalies and indicators of compromise (IOCs) that suggest malware presence.

Furthermore, the data correlation subsystem 218 may employ advanced one or more AI models and one or more machine learning models to enhance the accuracy and reliability of the data correlations. The one or more AI models and the one or more machine learning models may learn from historical data, improving their ability to detect subtle patterns and correlations that might indicate sophisticated malware attacks. The data correlation subsystem 218 may also integrate with external malware intelligence platforms and the one or more databases 104 to enrich the endpoint visibility data with additional context and insights, further enhancing the system's 102 ability to detect and respond to the emerging malware.

In an exemplary embodiment, the embeddings generation subsystem 208 is configured to generate one or more numerical embeddings for at least one of: each file of the one or more files and each application of the one or more applications of each endpoint device 116 using the one or more AI models based on at least one of the: endpoint visibility data, publicly available information, and sandbox analysis data. The one or more numerical embeddings is vector representations that capture one or more essential characteristics and one or more patterns of at least one of the: one or more files and one or more applications, enabling efficient and accurate analysis by downstream the one or more machine learning models.

The embeddings generation subsystem 208 is operatively connected with the unsupervised training subsystem 220. The unsupervised training subsystem 220 is configured with an autoencoder, which is a type of neural network used for learning efficient codings of the obtained endpoint visibility data. This autoencoder pre-trains the embeddings generation subsystem 208 using at least one of: unlabeled endpoint visibility data, publicly available information, and sandbox analysis data. The purpose of this pre-training is to learn at least one of the following: general patterns and feature values of at least one of the: one or more files and one or more applications.

The pre-training process involves feeding the autoencoder with the large volumes of unlabeled data, allowing it to learn inherent structures and patterns without supervision. This learning includes understanding normal behaviors and variations within the endpoint visibility data, which may then be used to identify anomalies indicative of the malware. The autoencoder consists of an encoder, which compresses the input endpoint visibility data into a lower-dimensional representation, and a decoder, which reconstructs the original data from this compressed representation. By minimizing the difference between the original data and reconstructed data, the autoencoder learns meaningful features that are useful for generating the one or more numerical embeddings. The general patterns refer to the regularities and recurring structures that may be observed in the endpoint visibility data. The general patterns assist the one or more AI models to recognize common behaviors and trends, which may be used to differentiate between normal activities and abnormal activities. The feature values are the specific data points and attributes extracted from the raw data that serve as inputs to the one or more AI models. The feature values capture essential characteristics of the files, applications, and activities being analyzed.

Once pre-trained, the embeddings generation subsystem 208 uses a Graph Convolutional Network (GCN) as the one or more AI models to generate the one or more numerical embeddings. The GCNs are specifically configured to operate on graph-structured data, making them ideal for analyzing relationships and interactions within the one or more dynamic directed graphs that represent the endpoint visibility data. Each node of the one or more nodes in the one or more dynamic directed graphs represents an endpoint activity, such as process behaviors, file access patterns, and network communication flows, while edges represent interactions and relationships between the activities.

The GCN processes the one or more dynamic directed graphs by aggregating information from a node's neighbors, enabling it to learn rich, context-aware embeddings that capture both the local structure and global context of the graph. This aggregation is achieved through convolutional operations that iteratively combine the features of neighboring nodes. The resulting one or more numerical embeddings encapsulate complex dependencies and interactions within the data, providing a powerful representation for subsequent analysis.

The embeddings generation subsystem 208 also leverages additional features derived from the publicly available information and the sandbox analysis data. The publicly available information may include malware intelligence feeds, vulnerability reports, and the cybersecurity news, which provide external context and enhance the one or more numerical embeddings with up-to-date malware landscape insights. The sandbox analysis data provides detailed behavioral profiles of the suspicious one or more files and the one or more applications, capturing how they interact with the system 102 when executed in an isolated environment.

By integrating these diverse data sources, the embeddings generation subsystem 208 creates the comprehensive and robust one or more numerical embeddings that significantly enhance the system's 102 ability to detect and analyze the malware. The one or more numerical embeddings serve as an input to other subsystems within the system 102, such as the graph generation subsystem 210 and the label propagation subsystem 212, enabling more accurate and efficient malware detection and classification.

In an exemplary embodiment, the graph generation subsystem 210 is configured with the one or more AI models to generate the one or more dynamic directed graphs. The one or more dynamic directed graphs comprise at least one of the: one or more nodes and one or more edges of each endpoint device 116 of the one or more endpoint devices 116. The one or more dynamic directed graphs is generated based on the one or more numerical embeddings generated by the embeddings generation subsystem 208, which encapsulate the essential characteristics and patterns of the one or more endpoint activities derived from the endpoint visibility data. The graph generation subsystem 210 is equipped with GNNs as the one or more AI models to facilitate the creation of the one or more dynamic directed graphs in real-time. As up-to-date endpoint visibility data is obtained by the data-obtaining subsystem 206, the graph generation subsystem 210 uses the up-to-date endpoint visibility data to continuously update the structure and content of the one or more dynamic directed graphs. This real-time capability ensures that the system 102 maintains an accurate and current representation of the endpoint activities, allowing for timely detection and response to the potential malware.

Each node of the one or more nodes within the one or more dynamic directed graphs represents the one or more endpoint activities. These activities include, but are not limited to, the following: process behaviors, file access patterns, and network communication flows on each endpoint device 116. For instance, a node might represent the execution of a specific process, the access of a particular file, and a network connection established by an application. The one or more nodes are enriched with the one or more numerical embeddings that provide a detailed and nuanced representation of the activities they symbolize. Each edge of the one or more edges in the one or more dynamic directed graphs signifies at least one of the following: interactions and relationships between the one or more nodes. Such interactions and relationships may include, but are not limited to, process-to-process communications, process-to-library communications, and process-to-file communications. For example, an edge might represent a communication link between two processes, a process loading a dynamic link library (DLL), or a process reading or writing to a file. These edges are crucial for understanding the context and dependencies of the one or more endpoint activities, enabling the system 102 to identify abnormal or suspicious patterns indicative of malware.

The graph generation subsystem 210 is also designed to manage a size and complexity of the one or more dynamic directed graphs. To prevent the one or more dynamic directed graphs from growing indefinitely, the graph generation subsystem 210 is configured to update the graphs by terminating at least one of the: one or more nodes and one or more edges within a pre-defined time period. This mechanism facilitates controlling the size of the one or more dynamic directed graphs, ensuring they remain computationally manageable and efficient to process. The pre-defined time period for retaining the one or more nodes and the one or more edges ranges between 24 hours and 120 hours, which is adjustable based on the system 102 requirements and operational context.

Additionally, the one or more dynamic directed graphs provide a rich and detailed view of the one or more endpoint activities and their interactions, which is essential for the effective malware detection. The use of the GNNs allows the system 102 to leverage the structural information of the one or more dynamic directed graphs, enhancing its ability to identify subtle and complex anomalies that might be missed by traditional analysis methods. By continuously updating the one or more dynamic directed graphs in real-time, the system 102 ensures that it has the most recent and relevant information to detect and respond to the emerging malware promptly.

In an exemplary embodiment, the label propagation subsystem 212 is configured to assign a label to each node of the one or more nodes across the one or more dynamic directed graphs. This is achieved using the one or more machine learning models based on a pre-defined labeled dataset, which aids in optimizing the generation of the one or more numerical embeddings for the purpose of classifying the each node of the one or more nodes as one of: a benign node and a malicious node. The label propagation subsystem 212 employs a label propagation model as the one or more machine learning models, along with GNNs as the one or more AI models, to iteratively update and refine the label of each node. The labeling process is influenced by the labels of neighboring nodes, using a weighted majority rule that considers the strength and significance of connections between the one or more nodes to propagate the labels effectively.

The pre-defined labeled dataset includes the historical data that is manually classified by the one or more users and through automated processes. The pre-defined labeled dataset serves as a foundational reference for training the one or more machine learning models to recognize patterns and characteristics associated with benign activities and malicious activities. The label propagation model works by spreading the labels across the one or more dynamic directed graphs, leveraging the relationships and the interactions between the one or more nodes. For instance, if a node is connected to several other nodes labeled as the malicious, it is likely to be labeled as the malicious as well, based on the weighted majority rule. This weighted majority rule assigns weights to the one or more edges connecting the one or more nodes, which represent the strength of influence that one node has over another in the labeling process.

The label propagation subsystem 212 is operatively connected with the supervised learning subsystem 222. The supervised learning subsystem 222 is configured to optimize the label propagation process by using one or more objective functions. The one or more objective functions is mathematical formulations that one or more supervised learning models aim to one of: minimize and maximize during training. One commonly used objective function in this context is the cross-entropy loss function, which measures the difference between the predicted labels and the actual labels in the pre-defined labeled dataset.

The supervised learning subsystem 222 continuously improves the performance of the label propagation subsystem 212 by adjusting the parameters of the one or more machine learning models. During the training, the system 102 uses labeled examples to learn the finest ways to propagate the labels across the one or more dynamic directed graphs. This involves fine-tuning the weights assigned to the one or more edges and optimizing the parameters of the GNNs to ensure accurate and efficient label propagation. By using the cross-entropy as the one or more objective functions, the system 102 aims to reduce errors in classification, thereby enhancing the accuracy of detecting malicious nodes.

Furthermore, the label propagation subsystem 212, in conjunction with the supervised learning subsystem 222, facilitates the optimization of the one or more numerical embedding generation processes. The one or more numerical embeddings encapsulate detailed feature representations of the one or more nodes, which are crucial for accurate classification. The iterative process of the label propagation, guided by the supervised learning subsystem 222, ensures that the one or more numerical embeddings is continuously refined to reflect the most relevant and distinguishing features of the benign activities and the malicious activities.

In an exemplary embodiment, the maliciousness scoring subsystem 214 is configured to compute a maliciousness risk score for each node of the one or more nodes using the one or more AI models based on at least one of the: assigned labels, one or more numerical embeddings, and one or more dynamic directed graphs for detecting the malware in the one or more endpoint devices 116. The maliciousness scoring subsystem 214 leverages the rich data encapsulated in the labels, the one or more numerical embeddings, and graph structures to provide a comprehensive risk assessment of each node associated with at least one of the: one or more files and one or more applications.

The maliciousness scoring subsystem 214 is configured to use the GNNs as the one or more AI models to compute the maliciousness risk score. The GNNs analyze the complex relationships and the interactions between the one or more nodes in the one or more dynamic directed graphs to determine the likelihood of the node being associated with the malicious activity. The maliciousness risk score is a quantitative measure that falls within a defined range. Wherein if the maliciousness risk score is one of: within a threshold score of the defined range and equal to the threshold score of the defined range, the system 102 determines that at least one of the: one or more files and one or more applications associated with the one or more nodes is benign. If the maliciousness risk score exceeds the threshold score of the defined range, the system 102 determines that at least one of the: one or more files and one or more applications associated with the one or more nodes is malicious.

In the illustrative embodiment, the defined range falls from 0 to 1, where 0 represents no risk and 1 represents the highest risk. If the maliciousness risk score exceeds 0.5 (neural), the maliciousness scoring subsystem 214 is configured to generate an alert indicating potential malicious activity. This threshold score of 0.5 serves as a critical point where the system 102 distinguishes between benign and potentially harmful activities. Upon generating the alert, the information about the alert, including the maliciousness risk score and related details, gets merged into the raw event data. This comprehensive event data is then formatted and saved in a JavaScript Object Notation (JSON) database of the one or more databases 104 for further analysis and record-keeping.

In another exemplary embodiment, while a commonly utilized defined range for the maliciousness risk score falls from 0 to 1, where 0 indicates a benign node and 1 indicates a highly malicious node, it is noteworthy that the defined range is not inherently restricted to these bounds. The range may be adapted to any numerical interval suitable for the specific application and system 102 requirements. For instance, the defined range could extend from −1 to 1, with negative values indicating benign activity and positive values indicating varying degrees of maliciousness. Alternatively, a range from 0 to 100 may be employed, providing a more granular scale for risk assessment. The flexibility in defining the range allows for greater customization and precision in the risk scoring model, ensuring it aligns with the specific context and operational parameters of the system 102.

In an exemplary embodiment, the maliciousness scoring subsystem 214 is operatively connected to the alert generation subsystem 224. The alert generation subsystem 224 is configured to generate one or more alerts if the generated maliciousness risk score exceeds the threshold score of the defined range. The alert generation subsystem 224 acts a critical role in the system 102 by ensuring that potential malware are promptly identified and communicated to relevant stakeholders for timely intervention.

The alert generation subsystem 224 operates based on the maliciousness risk score computed by the maliciousness scoring subsystem 214. When the maliciousness risk score exceeds a predefined threshold score (e.g., 0.5), the alert generation subsystem 224 triggers the one or more alerts to signal the detection of the potentially malicious activity. The threshold score is carefully chosen to balance the system's 102 sensitivity and specificity, ensuring that the one or more alerts is generated for genuinely suspicious activities while minimizing false positives. The alert generation subsystem 224 may produce diverse types of alerts, tailored to the needs of the one or more users and one or more-use cases. The diverse types of alerts include, but are not limited to, email alerts, SMS alerts, push notifications, dashboard alerts, log entries, and the like.

The alert generation subsystem 224 not only generates the one or more alerts but also integrates with other security systems and workflows to ensure comprehensive malware management. For instance, the one or more alerts may be linked to incident response subsystems, triggering automated response actions comprises at least one of: isolating affected devices, initiating scans, and deploying patches. This integration enhances the organization's ability to respond to malwares swiftly and effectively. The one or more alerts serves several important purposes comprises at least one of: timely malware detection and response, enhanced situational awareness, improved resource allocation, compliance and reporting, continuous improvement, and the like.

The one or more alerts enables immediate notification of potential malwares, allowing the one or more users to respond quickly and mitigate the risks before they escalate. By providing the real-time insights into the security status of the one or more endpoint devices 116, the one or more alerts assist organizations maintain a high level of situational awareness and readiness. The clear and actionable one or more alerts, the one or more users prioritize their efforts and resources towards addressing the most critical malwares. The one or more alerts and the associated logs provide valuable data for compliance reporting and security audits, demonstrating the organization's proactive approach to malware management. By analyzing the patterns and outcomes of the one or more alerts, organizations may continuously improve their malware detection and response strategies, refining their security posture over time.

In an exemplary embodiment, the attribute synthesis subsystem 216 is configured to generate one or more synthetic attributes using the endpoint visibility data during the pre-training of the embeddings generation subsystem 208 for optimizing at least one of: the detection of malware and the performance of one or more AI models. The one or more synthetic attributes are numerical vectors of a fixed dimension of 128. The attribute synthesis subsystem 216 is configured to enhance the system's 102 ability to detect malware by creating the synthetic attributes that may represent complex patterns and behaviors observed in the endpoint visibility data. The one or more synthetic attributes serve as additional input features for the embeddings generation subsystem 208, thereby enriching the data representation and improving the accuracy of the AI models used for the malware detection.

Figure 3:
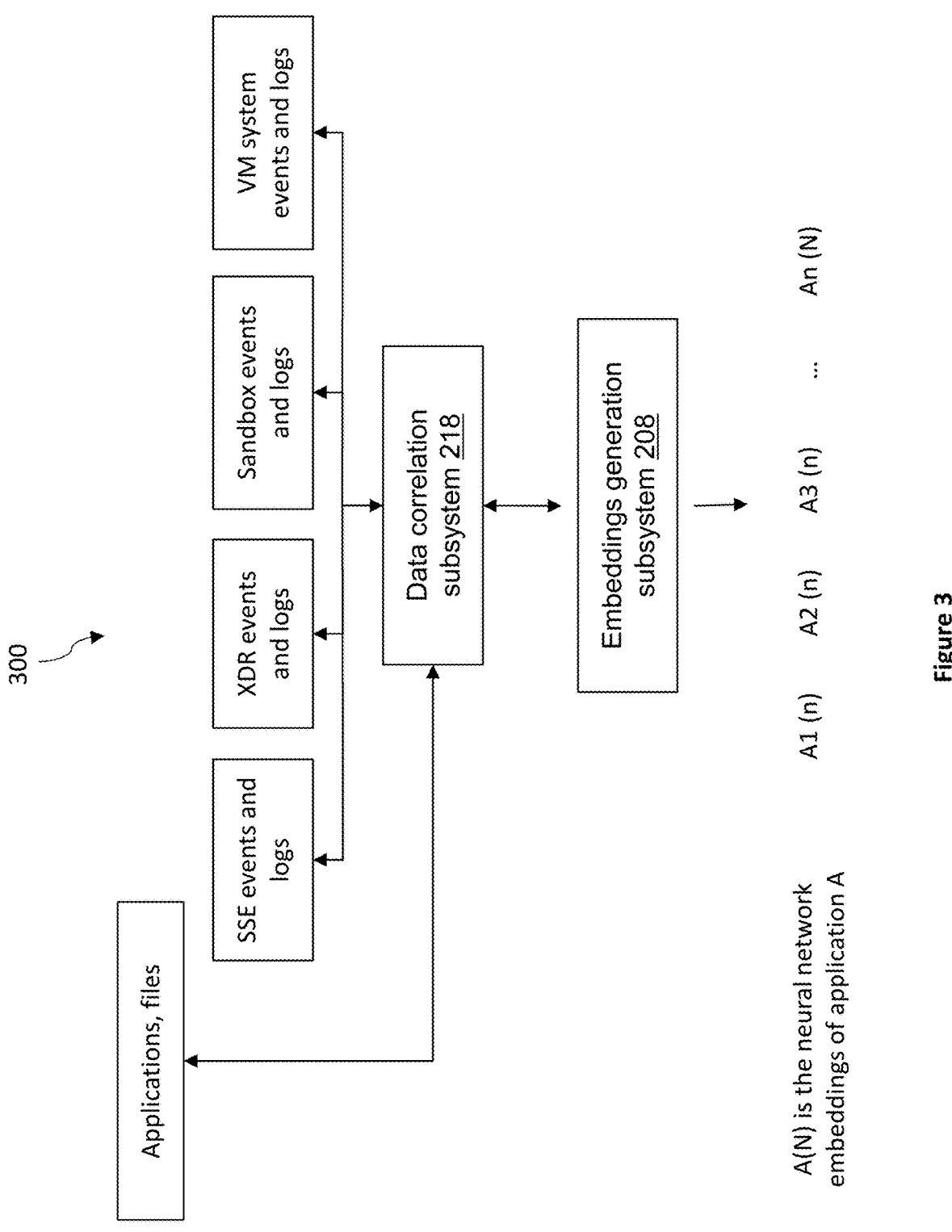
FIG. 3 illustrates an exemplary block diagram depicting data collection and synthesis of one or more nodes with one or more numerical embeddings, in accordance with an embodiment of the present disclosure.

FIG. 3 illustrates an exemplary block diagram 300 depicting data collection and synthesis of the one or more nodes with the one or more numerical embeddings, in accordance with an embodiment of the present disclosure.

In an illustrative embodiment, the system 102 is configured to obtain at least one of the: SSE events, SSE logs, XDR events, XDR logs, sandbox events, sandbox logs, vulnerability management events, and vulnerability management logs. The obtained at least one of the: SSE events, SSE logs, XDR events, XDR logs, sandbox events, sandbox logs, vulnerability management events, and vulnerability management logs are transferred to the data correlation subsystem 218. The data correlation subsystem 218 configured to perform the multi-source data fusion for correlating at least one of the: obtained at least one of the: SSE events, SSE logs, XDR events, XDR logs, sandbox events, sandbox logs, vulnerability management events, and vulnerability management logs based on at least one of the: IDs and timestamps to create at least one of the: time-ordered sequence of events, and pre-defined time intervals for processing the obtained data for generating the one or more numerical embeddings. The correlated data is feed to the embeddings generation subsystem 208 for generating the one or more numerical embeddings for at least one of: each file of the one or more files and each application of the one or more applications of each endpoint device 116. For instance, "A" is an application where the system 102 generates the one or more numerical embeddings such as $A_1(N)$, $A_2(N)$, . . . , $A_n(N)$ using the one or more AI models.

Figure 4:
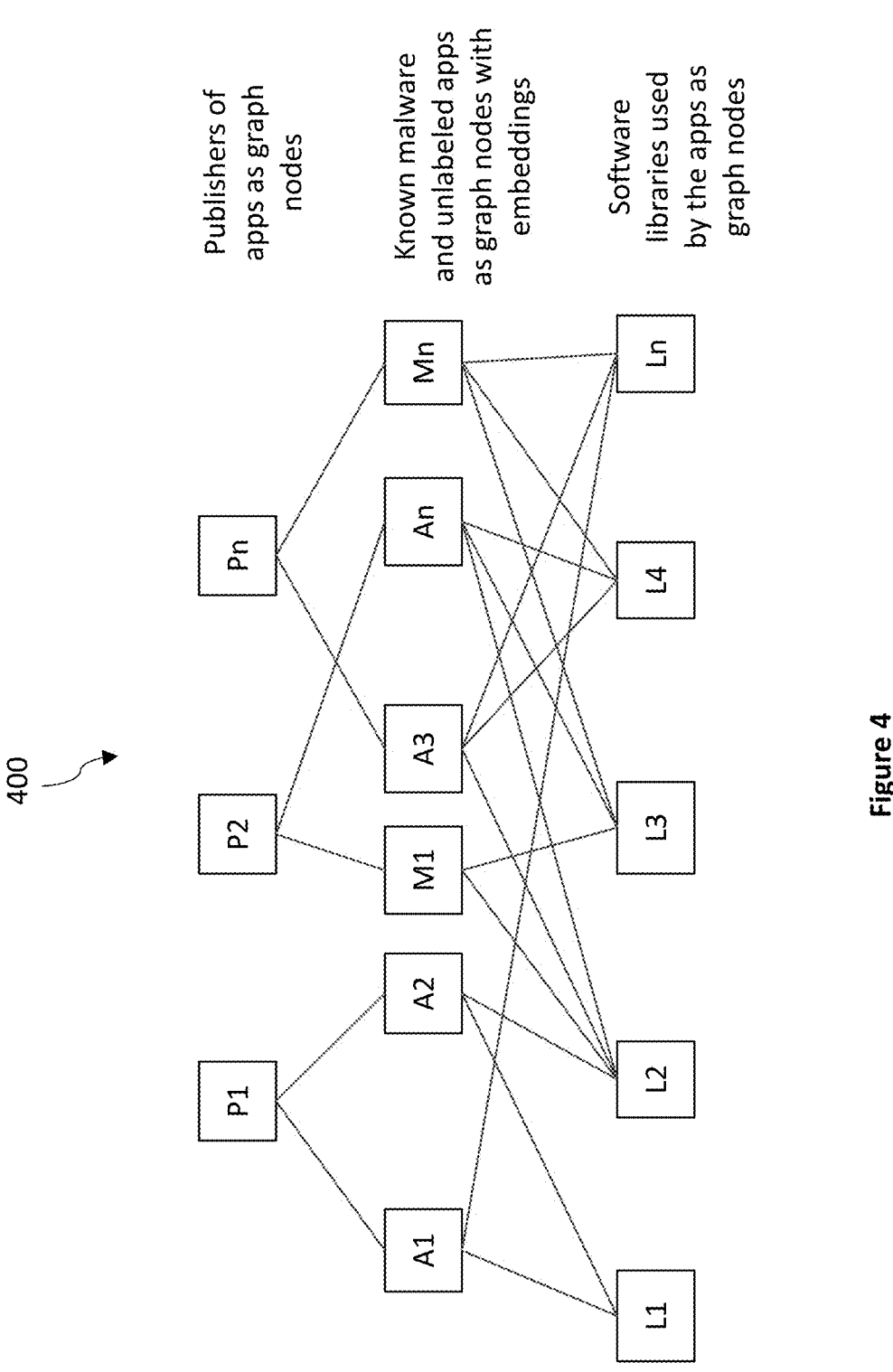
FIG. 4 illustrates an exemplary one or more dynamic directed graphs generation depicting the one or more nodes with the one or more numerical embeddings, in accordance with an embodiment of the present disclosure.

FIG. 4 illustrates an exemplary one or more dynamic directed graphs generation 400 depicting the one or more nodes with the one or more numerical embeddings, in accordance with an embodiment of the present disclosure.

In an illustrative embodiment, the one or more dynamic directed graphs generation 400 demonstrates the process of generating, updating, and analyzing the one or more dynamic directed graphs using the one or more AI models to detect the malware in the one or more endpoint devices 116. The one or more dynamic directed graphs generation 400 outlines the relationships between the one or more nodes and the one or more edges in the one or more dynamic directed graphs and highlights the interactions and data flows within the system 102.

In the illustrative embodiment, the one or more dynamic directed graphs generation 400 comprises publisher applications as $P_1$, $P_2$, . . . , $P_n$, known malware and unlabeled nodes as $M_1$, $M_2$, . . . , $M_n$, and one or more nodes of the at least one of the: one or more files and one or more applications as $L_1$, $L_2$, . . . , $L_n$. The one or more dynamic directed graphs generation 400 depicts the relationship between the one or more nodes and the neighboring one or more nodes for detecting the malware. The $M_1$, $M_2$, . . . , $M_n$ represents the malware of another application nodes with known labels for the purpose of analysis. At least one of: one or more files and one or more applications without the labels are placed on the one or more dynamic directed graphs. The one or more nodes represent one of: the one or more applications and the one or more files. The links represent the relationships and dependencies between the one or more nodes. Without using any labels, the unsupervised training subsystem 220 is used to learn the initial one or more numerical embeddings of the one or more nodes based on a global minimization model to minimize a graph reconstruction error. Then with a small number of labeled nodes, the system 102 is configured to deduce the labels for the one or more nodes without the labels based on a majority vote of the neighboring one or more nodes that have labels and their numerical averages of all the features. The generated labels may be further fed back into the supervised learning subsystem 222 that focuses on minimizing a different kind of objective function to fine tune the one or more numerical embeddings.

FIG. 5 illustrates an exemplary flow chart of an artificial intelligence (AI)-based method 500 for detecting the malware in the one or more endpoint devices 116 using the multi-source data fusion, in accordance with an embodiment of the present disclosure.

At step 502, the AI-based method 500 includes collecting, by the monitoring engine associated with each endpoint device of the one or more endpoint devices, the endpoint visibility data associated with at least one of the: one or more files and one or more applications of each endpoint device. The monitoring engine comprises at least one of, but not limited to, at least one of the: SSE, XDR, EDR, Sandbox, VM tools, sysmon engine, OSQuery engine, AuditD engine, WMI engine, Prometheus Node Exporter, Elastic Agent, Splunk Universal Forwarder, MDM, and the like. The endpoint visibility data includes the detailed logs and the real-time information from the one or more endpoint devices, such as, but not limited to, at least one of the: process activities, file accesses, network connections, system libraries, application metadata, application behavior, event logs, user activity, endpoint configuration, existing security alerts, SSE events, SSE logs, XDR events, XDR logs, and the like.

At step 504, the AI-based method 500 includes collecting, by the resource data collecting module, at least one of the: publicly available information and sandbox analysis data. The publicly available information, including, but not limited to, at least one of the: publisher details, publish dates, region of the publisher, country of the publisher, and user ratings and user reviews about at least one of the: one or more files and one or more applications of each endpoint device of the one or more endpoint devices. The resource data collecting module may also gather the sandbox analysis data, which includes, but not limited to, at least one of the: libraries used during execution, CPU utilization, endpoint device memory usage patterns, file events, Registry events, startup events, autostart events, DNS queries, IP addresses accessed, network ports opened, network ports for listening, port type, traffic type, encrypted traffic, unencrypted traffic, cipher used for encrypted traffic, cipher strength, connection duration, and the like.

At step 506, the AI-based method 500 includes obtaining, by the one or more servers, at least one of the: endpoint visibility data, publicly available information, and sandbox analysis data using the multi-source data fusion. The multi-source data fusion, which involves integrating and correlating the data from different sources to provide the unified and comprehensive view of the security posture. The correlation is based on at least one of the following criteria: the user IDs and the timestamps. The user IDs utilizes in associating the activities and the events with specific one or more endpoint devices, while the timestamps enable the chronological ordering of the events to understand the sequence and the timing of the actions across the one or more endpoint devices. The one or more servers use these criteria to create at least one of the following: the time-ordered sequence of the events and the pre-defined time intervals for processing the endpoint visibility data. The time-ordered sequence of events allows for the detailed reconstruction of the actions leading up to and following the potential malware incident, providing valuable context for forensic analysis and incident response. The pre-defined time intervals, which range between 1 minute and 15 minutes, are used to batch and process the data in the manageable segments, ensuring that the system may handle the large volumes of the data efficiently and detect the malware in the near real-time.

At step 508, the AI-based method 500 includes generating, by the one or more servers, the one or more numerical embeddings for at least one of the: each file of the one or more files and each application of the one or more applications of each endpoint device using the one or more AI models based on at least one of the: endpoint visibility data, publicly available information and sandbox analysis data. The one or more servers is configured with the autoencoder, which is the type of the neural network used for learning the efficient codings of the obtained endpoint visibility data. This autoencoder pre-trains the one or more AI models using at least one of the: unlabeled endpoint visibility data, publicly available information, and sandbox analysis data. The purpose of the pre-training is to learn at least one of the following: the general patterns and the feature values of at least one of the: one or more files and one or more applications. The one or more servers also leverages the additional features derived from the publicly available information and the sandbox analysis data. The publicly available information may include the malware intelligence feeds, the vulnerability reports, and the cybersecurity news, which provide external context and enhance the one or more numerical embeddings with the up-to-date malware landscape insights. The sandbox analysis data provides the detailed behavioral profiles of the suspicious one or more files and the one or more applications, capturing how they interact with the system when executed in the isolated environment. The one or more numerical embeddings serve as the input to other processes for enabling the more accurate and efficient malware detection and the classification.

At step 510, the AI-based method 500 includes generating, by the one or more servers configured with the one or more AI models, the one or more dynamic directed graphs comprises at least one of the: one or more nodes and one or more edges of each endpoint device of the one or more endpoint devices based on the generated one or more numerical embeddings for analyzing the endpoint visibility data. The one or more servers is equipped with the GNNs as the one or more AI models to facilitate the creation of the one or more dynamic directed graphs in the real-time. As the up-to-date endpoint visibility data is obtained to the one or more servers, it uses the up-to-date endpoint visibility data to continuously update the structure and the content of the one or more dynamic directed graphs.

At step 512, the AI-based method 500 includes assigning, by the one or more servers, the label to each node of the one or more nodes across the one or more dynamic directed graphs using the one or more machine learning models based on the pre-defined labeled dataset to classify the one or more nodes as one of the: benign node and malicious node. The pre-defined labeled dataset includes the historical data that is manually classified by the one or more users and through the automated processes. The pre-defined labeled dataset serves as a foundational reference for the training the one or more machine learning models to recognize patterns and characteristics associated with the benign activities and the malicious activities. The label propagation model works by spreading the labels across the one or more dynamic directed graphs, leveraging the relationships and the interactions between the one or more nodes. The one or more servers is configured with the one or more supervised learning models to optimize the label propagation process by using the one or more objective functions. The one or more objective functions are the mathematical formulations that the one or more supervised learning models aim to minimize and maximize during the training. One commonly used objective function in this context is the cross-entropy loss function, which measures the difference between the predicted labels and the actual labels in the pre-defined labeled dataset.

At step 514, the AI-based method 500 includes computing, by the one or more servers, the maliciousness risk score for each node of the one or more nodes using the one or more AI models based on at least one of the: assigned labels, one or more numerical embeddings, and one or more dynamic directed graphs for detecting the malware in the one or more endpoint devices. The one or more servers leverages the rich data encapsulated in the labels, the one or more numerical embeddings, and the graph structures to provide the comprehensive risk assessment of each node associated with at least one of the: one or more files and one or more applications, one or more AI models to compute the maliciousness risk score. The GNNs analyze the complex relationships and the interactions between the one or more nodes in the one or more dynamic directed graphs to determine the likelihood of the node being associated with the malicious activity. The maliciousness risk score is the quantitative measure that falls within the defined range. Wherein if the maliciousness risk score is one of: within the threshold score of the defined range and equal to the threshold score of the defined range, the AI-based method 500 determines that at least one of the: one or more files and one or more applications associated with the one or more nodes is benign. If the maliciousness risk score exceeds the threshold score of the defined range, the AI-based method 500 determines that at least one of the: one or more files and one or more applications associated with the one or more nodes is malicious.

In the illustrative embodiment, where 0 represents no risk and 1 represents the highest risk. If the maliciousness risk score exceeds 0.5 (neural), the maliciousness scoring subsystem 214 is configured to generate the alert indicating potential malicious activity. This threshold score of 0.5 serves as the critical point where the AI-based method 500 distinguishes between the benign and the potentially harmful activities. Upon generating the alert, the information about the alert, including the maliciousness risk score and the related details, gets merged into the raw event data. This comprehensive event data is then formatted and saved in the JSON database of the one or more databases 104 for further analysis and the record-keeping.

Figure 6:
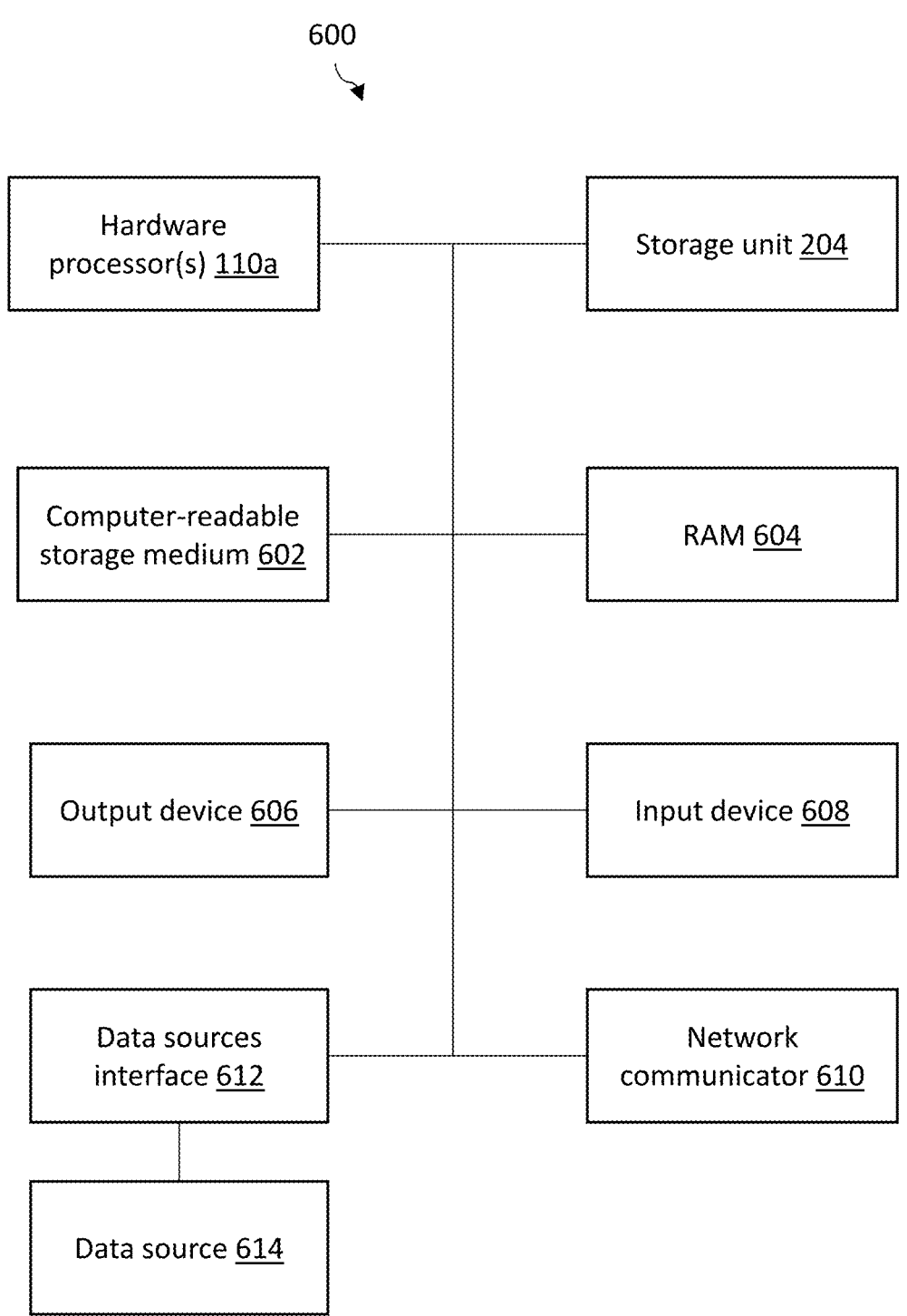
FIG. 6 illustrates an exemplary block diagram representation of a server platform for implementation of the disclosed AI-based system, in accordance with an embodiment of the present disclosure.

FIG. 6 illustrates an exemplary block diagram representation of a server platform 600 for implementation of the disclosed AI-based system 102, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the server platform 600. As illustrated, the server platform 600 may include additional components not shown, and some of the components described may be removed and/or modified. For example, a computer system with multiple graphics processing units (GPUs) may be located on at least one of: internal printed circuit boards (PCBs) and external-cloud platforms including Amazon Web Services, internal corporate cloud computing clusters, or organizational computing resources.

The server platform 600 may be a computer system such as the system 102 that may be used with the embodiments described herein. The computer system may represent a computational platform that includes components that may be in the one or more servers 110 or another computer system. The computer system may be executed by the one or more hardware processors 110a (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 110a that execute software instructions or code stored on a non-transitory computer-readable storage medium 602 to perform methods of the present disclosure. The software code includes, for example, instructions to gather data and analyze the data. For example, the plurality of subsystems 114 includes the data-obtaining subsystem 206, the embeddings generation subsystem 208, the graph generation subsystem 210, the label propagation subsystem 212, the maliciousness scoring subsystem 214, the attribute synthesis subsystem 216, the data correlation subsystem 218, the unsupervised training subsystem 220, the supervised learning subsystem 222, and the alert generation subsystem 224.

The instructions on the computer-readable storage medium 602 are read and stored the instructions in one of: the storage unit 204 and the RAM 604. The storage unit 204 may provide a space for keeping static data where at least some instructions could be stored for later execution. The stored instructions may be further compiled to generate other representations of the instructions and dynamically stored in the RAM 604. The one or more hardware processors 110a may read instructions from the RAM 604 and perform actions as instructed.

The computer system may further include a output device 606 to provide at least some of the results of the execution as output including, but not limited to, visual information to users, such as external agents. The output device 606 may include a display on computing devices and virtual reality glasses. For example, the display may be a mobile phone screen or a laptop screen. GUIs and/or text may be presented as an output on the display screen. The computer system may further include an input device 608 to provide a user or another device with mechanisms for entering data and/or otherwise interacting with the computer system. The input device 608 may include, for example, a keyboard, a keypad, a mouse, or a touchscreen. Each of the output devices 606 and the input device 608 may be joined by one or more additional peripherals.

A network communicator 610 may be provided to connect the computer system to a network and in turn to other devices connected to the network including other entities, servers, data stores, and interfaces. The network communicator 610 may include, for example, a network adapter such as a LAN adapter or a wireless adapter. The computer system may include a data sources interface 612 to access the data source 614. The data source 614 may be an information resource. As an example, the one or more database 104 of exceptions and rules may be provided as the data source 614. Moreover, knowledge repositories and curated data may be other examples of the data source 614. The data source 614 may include libraries containing, but not limited to, pre-compiled datasets, real-time data feeds, historical logs, and third-party data repositories. The libraries serve as repositories for various types of data critical to the functioning of the system 102. For instance, pre-compiled datasets may consist of known malware signatures, behavioral patterns, and heuristic rules derived from extensive cybersecurity research.

Numerous advantages of the present disclosure may be apparent from the discussion above. In accordance with the present disclosure, the system and the AI-based method for detecting the malware in the one or more endpoint devices using the multi-source data fusion, the GNNs, the deep learning models, and other one or more AI-based models. By integrating the data from multiple sources such as the endpoint visibility data, the publicly available information, and the sandbox analysis data, the system achieves a comprehensive and holistic view of the network environment. This multi-source data fusion enhances the accuracy and reliability of the malware detection by correlating diverse data points and identifying complex patterns indicative of the malicious activity.

Furthermore, the use of the GNNs allows for the effective analysis of the relationships and the interactions within the one or more dynamic directed graphs, representing the real-time activities and the connections of the one or more endpoint devices. This graph-based approach enables the system to detect the sophisticated malware behaviors that might otherwise go unnoticed by the traditional security measures. The one or more deep learning models contribute to the system's ability to learn and adapt to new threats by continuously improving its understanding of normal and anomalous behaviors through extensive training on the large datasets.

Other AI-based models, such as the autoencoders and the one or more supervised learning models, further optimize the detection process by refining the one or more numerical embeddings and enhancing the label propagation subsystem. This ensures that the system may accurately classify the one or more nodes as benign and malicious, thereby reducing the false positives and improving the response times. Additionally, the system's capability to generate the real-time one or more alerts based on the maliciousness risk scores allows for prompt action to mitigate the threats. This proactive approach to cybersecurity assists in minimizing potential damage and maintaining the integrity of the one or more endpoint devices.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. An artificial intelligence (AI)-based system for detecting malware in one or more endpoint devices using a multi-source data fusion, comprising:

a monitoring engine associated with each endpoint device of the one or more endpoint devices, configured to collect endpoint visibility data associated with at least one of: one or more files and one or more applications of each endpoint device;

a resource data collecting module configured to collect at least one of: publicly available information and sandbox analysis data; and one or more servers, comprising:

one or more hardware processors;

a memory unit operatively connected to the one or more hardware processors, wherein the memory unit comprises a set of computer-readable instructions in form of a plurality of subsystems, configured to be executed by the one or more hardware processors, wherein the plurality of subsystems comprises:

a data-obtaining subsystem configured to obtain at least one of the: endpoint visibility data, publicly available information and sandbox analysis data using the multi-source data fusion;

an embeddings generation subsystem configured to generate one or more numerical embeddings for at least one of: each file of the one or more files and each application of the one or more applications of each endpoint device using one or more artificial intelligence (AI) models based on at least one of the: endpoint visibility data, publicly available information and sandbox analysis data;

a graph generation subsystem configured with the one or more artificial intelligence (AI) models to generate one or more dynamic directed graphs comprises at least one of: one or more nodes and one or more edges of each endpoint device of the one or more endpoint devices based on the generated one or more numerical embeddings for analyzing the endpoint visibility data;

a label propagation subsystem configured to assign a label to each node of the one or more nodes across the one or more dynamic directed graphs using one or more machine learning models based on a pre-defined labeled dataset for optimizing the generation of one or more numerical embeddings to classify the one or more nodes as one of a: benign node and malicious node; and a maliciousness scoring subsystem configured to compute a maliciousness risk score for each node of the one or more nodes using the one or more artificial intelligence (AI) models based on at least one of the: assigned labels, one or more numerical embeddings, and one or more dynamic directed graphs for detecting the malware in the one or more endpoint devices.

2. The artificial intelligence (AI)-based system of claim 1, wherein the monitoring engine comprises at least one of: a Secure Service Edge (SSE), an Extended Detection and Response (XDR), an Endpoint Detection and Response (EDR), a Sandbox, Vulnerability Management (VM) tools, a sysmon engine, an OSQuery engine, an AuditD engine, a Windows Management Instrumentation (WMI) engine, a Prometheus Node Exporter, an Elastic Agent, a Splunk Universal Forwarder, and Apple Device Management (MDM).

3. The artificial intelligence (AI)-based system of claim 1, wherein the one or more endpoint devices comprises at least one of: computers, mobile devices, and networking equipment.

4. The artificial intelligence (AI)-based system of claim 1, wherein the endpoint visibility data comprises at least one of: process activities, file accesses, network connections, system libraries, application metadata, application behavior, event logs, user activity, endpoint configuration, existing security alerts, Secure Service Edge (SSE) events, Secure Service Edge (SSE) logs, Extended Detection and Response (XDR) events, Extended Detection and Response (XDR) logs, vulnerability management events, and vulnerability management logs.

5. The artificial intelligence (AI)-based system of claim 1, wherein the publicly available information comprises at least one of: publisher details, publish dates, region of the publisher, country of the publisher, and user ratings and user reviews about at least one of the: one or more files and one or more applications of each endpoint device of the one or more endpoint devices; and the sandbox analysis data comprises at least one of: libraries used during execution, central processing unit (CPU) utilization, endpoint device memory usage patterns, file events, Registry events, startup events, autostart events, Domain Name System (DNS) queries, Internet Protocol (IP) addresses accessed, network ports opened, network ports for listening, port type, traffic type, encrypted traffic, unencrypted traffic, cipher used for encrypted traffic, cipher strength, and connection duration.

6. The artificial intelligence (AI)-based system of claim 1, wherein the data-obtaining subsystem is operatively connected to a data correlation subsystem, the data correlation subsystem configured to perform the multi-source data fusion for correlating at least one of the: endpoint visibility data, publicly available information, and the sandbox analysis data based on at least one of: user identifications (IDs) and timestamps to create at least one of: time-ordered sequence of events, and pre-defined time intervals for processing the endpoint visibility data for detecting the malware, the pre-defined time intervals ranges between 1 minute and 15 minutes.

7. The artificial intelligence (AI)-based system of claim 1, wherein the embeddings generation subsystem operatively connected with an unsupervised training subsystem, the unsupervised training subsystem configured with an autoencoder to pre-train the embeddings generation subsystem using at least one of: unlabeled endpoint visibility data, the publicly available information, and the sandbox analysis data to learn at least one of:

general patterns and feature values of the one or more nodes for generating the one or more numerical embeddings; and the embeddings generation subsystem configured to use a Graph Convolutional Network (GCN) as the one or more artificial intelligence (AI) models to generate the one or more numerical embeddings.

8. The artificial intelligence (AI)-based system of claim 1, wherein the graph generation subsystem configured with a Graph Neural Networks (GNNs) as the one or more artificial intelligence (AI) models to generate the one or more dynamic directed graphs in real-time as up-to-date endpoint visibility data is obtained in the data-obtaining subsystem; and the graph generation subsystem configured to update the one or more dynamic directed graphs by terminating at least one of the: one or more nodes and one or more edges within a pre-defined time period to control a size of the one or more dynamic directed graphs to infinity, the pre-defined time period ranges between 24 hours and 120 hours.

9. The artificial intelligence (AI)-based system of claim 1, wherein each node of the one or more nodes in the one or more dynamic directed graphs represent one or more endpoint activities, the one or more endpoint activities comprises at least one of: process behaviors, file access patterns, and network communication flows on each endpoint device of the one or more endpoint devices; and each edge of the one or more edges in the one or more dynamic directed graphs represent at least one of: interactions and relationships between the one or more nodes, at least one of the: interactions and relationships comprises at least one of: process-to-process communications, process-to-library communications, and process-to-file communications.

10. The artificial intelligence (AI)-based system of claim 1, wherein the label propagation subsystem configured to use a label propagation model as the one or more machine learning models and the Graph Neural Networks (GNNs) as the one or more artificial intelligence (AI) models to iteratively update and optimize the label of each node of the one or more nodes based on one or more neighboring nodes using a weighted majority rule, the label propagation subsystem operatively connected with a supervised learning subsystem, the supervised learning subsystem configured to optimize the label propagation subsystem using one or more objective functions for optimizing the generation of the one or more numerical embeddings.

11. The artificial intelligence (AI)-based system of claim 1, wherein the maliciousness scoring subsystem is configured to use the Graph Neural Networks (GNNs) as the one or more artificial intelligence (AI) models to compute the maliciousness risk score, the maliciousness risk score comprises a defined range, wherein if the maliciousness risk score is one of: within a threshold score of the defined range and equal to the threshold score of the defined range, the artificial intelligence (AI)-based system determines that at least one of the: one or more files and one or more applications associated with the one or more nodes is benign, and wherein if the maliciousness risk score exceeds the threshold score of the defined range, the artificial intelligence (AI)-based system determines that at least one of the: one or more files and one or more applications associated with the one or more nodes is malicious.

12. The artificial intelligence (AI)-based system of claim 1, wherein the maliciousness scoring subsystem operatively connected to an alert generation subsystem, the alert generation subsystem configured to generate one or more alerts if the generated maliciousness risk score exceeds the threshold score of the defined range.

13. The artificial intelligence (AI)-based system of claim 1, wherein the plurality of subsystems comprises an attribute synthesis subsystem, the attribute synthesis subsystem configured to generate one or more synthetic attributes using the endpoint visibility data during the pre-train of the embeddings generation subsystem for optimizing at least one of the: detection of the malware and one or more artificial intelligence (AI) models, the one or more synthetic attributes is numerical vectors of a fixed dimensions of 128.

14. An artificial intelligence (AI)-based method for detecting malware in one or more endpoint devices using a multi-source data fusion, comprising:

collecting, by a monitoring engine associated with each endpoint device of the one or more endpoint devices, endpoint visibility data associated with at least one of: one or more files and one or more applications of each endpoint device;

collecting, by a resource data collecting module, at least one of: publicly available information and sandbox analysis data;

obtaining, by one or more servers, at least one of the: endpoint visibility data, publicly available information and sandbox analysis data using the multi-source data fusion;

generating, by the one or more servers, one or more numerical embeddings for at least one of: each file of the one or more files and each application of the one or more applications of each endpoint device using one or more artificial intelligence (AI) models based on at least one of the: endpoint visibility data, publicly available information and sandbox analysis data;

generating, by the one or more servers configured with the one or more artificial intelligence (AI) models, one or more dynamic directed graphs comprises at least one of: one or more nodes and one or more edges of each endpoint device of the one or more endpoint devices based on the generated one or more numerical embeddings for analyzing the endpoint visibility data;

assigning, by the one or more servers, a label to each node of the one or more nodes across the one or more dynamic directed graphs using one or more machine learning models based on a pre-defined labeled dataset to classify the one or more nodes as one of a: benign node and malicious node; and computing, by the one or more servers, a maliciousness risk score for each node of the one or more nodes using the one or more artificial intelligence (AI) models based on at least one of the: assigned labels, one or more numerical embeddings, and one or more dynamic directed graphs for detecting the malware in the one or more endpoint devices.

15. The artificial intelligence (AI)-based method of claim 14, comprising:

correlating, by the one or more servers, to perform the multi-source data fusion for at least one of the: endpoint visibility data, publicly available information, and sandbox analysis data based on at least one of: user identifications (IDs) and timestamps to create at least one of: time-ordered sequence of events, and pre-defined time intervals for processing the endpoint visibility data for detecting the malware, the pre-defined time intervals ranges between 1 minute and 15 minutes.

16. The artificial intelligence (AI)-based method of claim 14, wherein generating the one or more dynamic directed graphs comprises:

utilizing a Graph Neural Networks (GNNs) as the one or more artificial intelligence (AI) models to generate the one or more dynamic directed graphs in real-time as up-to-date endpoint visibility data is obtained; and updating the one or more dynamic directed graphs by terminating at least one of the: one or more nodes and one or more edges within a pre-defined time period to control a size of the one or more dynamic directed graphs to infinity, the pre-defined time period ranges between 24 hours and 120 hours.

17. The artificial intelligence (AI)-based method of claim 14, comprising:

pre-training, by the one or more servers, the one or more artificial intelligence (AI) models using an autoencoder and unlabeled endpoint visibility data to learn at least one of: general patterns and feature values of the one or more nodes for generating the one or more numerical embeddings; and using a Graph Convolutional Network (GCN) as the one or more artificial intelligence (AI) models to generate the one or more numerical embeddings.

18. The artificial intelligence (AI)-based method of claim 14, wherein assigning the label to each node of the one or more nodes comprises:

using a label propagation model as the one or more machine learning models and the Graph Neural Networks (GNNs) as the one or more artificial intelligence (AI) models to iteratively update and optimize the label of each node of the one or more nodes based on one or more neighboring nodes using a weighted majority rule; and optimizing, by the one or more servers, the generation of the one or more numerical embeddings using one or more objective functions.

19. The artificial intelligence (AI)-based method of claim 14, comprising:

generating, by the one or more servers, one or more synthetic attributes using the endpoint visibility data during the pre-training of the one or more artificial intelligence (AI) models for optimizing at least one of the: detection of the malware and one or more artificial intelligence (AI) models, the one or more synthetic attributes are numerical vectors of a fixed dimension of 128.

20. A non-transitory computer-readable storage medium storing computer-executable instructions that, when executed by one or more servers, cause the one or more servers to perform operations for detecting malware in one or more endpoint devices using a multi-source data fusion, the operations comprising:

obtaining at least one of: endpoint visibility data from each endpoint device of the one or more endpoint devices, publicly available information and sandbox analysis data using the multi-source data fusion, wherein at least one of the: endpoint visibility data, publicly available information and sandbox analysis data is associated with at least one of: one or more files and one or more applications of each endpoint device;

generating one or more numerical embeddings for at least one of: each file of the one or more files and each application of the one or more applications of each endpoint device using one or more artificial intelligence (AI) models based on at least one of the: endpoint visibility data, publicly available information and sandbox analysis data;

generating, using one or more artificial intelligence (AI) models, one or more dynamic directed graphs comprises at least one of: one or more nodes and one or more edges of each endpoint device of the one or more endpoint devices based on the generated one or more numerical embeddings for analyzing the endpoint visibility data;

assigning a label to each node of the one or more nodes across the one or more dynamic directed graphs using one or more machine learning models based on a pre-defined labeled dataset for classifying the one or more nodes to classify the one or more nodes as one of a: benign node and malicious node; and computing a maliciousness risk score for each node of the one or more nodes using the one or more artificial intelligence (AI) models based on at least one of the: assigned labels, one or more numerical embeddings, and one or more dynamic directed graphs for detecting the malware in the one or more endpoint devices.

* * * * *